Patented Jan. 15, 1946

2,393,041

UNITED STATES PATENT OFFICE 2,393,041

PROCESS FOR THE ISOMERIZATION OF PARAFFIN HYDROCARBONS

Bernard S. Greensfelder, Oakland, Calif., assignor to Shell Development Company, San Francisco, Calif., a corporation of Delaware No Drawing. Application May 8, 1944,
Serial No. 534,696

8 Claims. (Cl. 260—683.5)

The present invention relates to the catalytic isomerization of isomerizable lower boiling paraffin hydrocarbons having from four to six carbon atoms with metal sulfide catalysts at elevated temperatures in the presence of hydrogen under particular conditions.

The object of the invention is to provide a process whereby paraffin hydrocarbons of the class mentioned may be more or less selectively isomerized to isomeric paraffin hydrocarbons at relatively low pressures with excellent production capacity per volume of catalyst or per volume of catalytic reactor space and with excellent catalyst life.

In view of the great demand for branched chain paraffin hydrocarbons, and particularly the lower boiling paraffin hydrocarbons, much research has been done in developing processes for the practical production of these hydrocarbons from the readily available normal or less highly branched isomers by catalytic isomerization. The best results so far have been obtained by catalytic isomerization with metal halide catalysts, such in particular as aluminum cholride. Processes using this catalyst have been fairly well developed and are in commercial use. Although fairly good results have been obtained with these processes, they nevertheless have certain defects which so far have not been completely overcome. One of these is, for instance, the inability to treat ordinary refinery stocks. Most refinery stocks, such as the so-called butane fractions, pentane fractions, hexane fractions, straight run gasoline fractions, etc., contain small but appreciable concentrations of aromatic hyrocarbons, olefins, sulfur compounds, nitrogen bases, etc. These stocks cannot be used per se, but must be carefully refined to remove all but the minutest traces of these materials and thoroughly dried before they are suitable for treatment in the known processes. Another undesirable feature of the known processes is the necessity of using hydrogen chloride promoter (either added per se or formed in the process from added water, alcohol, alkyl chloride, or the like). In spite of every care, corrosion is a major problem. Other objectionable features of no less importance are the tendency for the aluminum chloride to form sludges which are generally difficult to handle, the tendency of aluminum chloride to dissolve in the product, and the tendency for aluminum chloride to sublime. Thus, while the known processes using aluminum chloride as a catalyst are fairly efficient and economical, it would be highly desirable to have a process which does not have these inherent disadvantages.

It has long been known that metal sulfides, such as the sulfides of molybdenum and tungsten in particular, are capable of causing the isomerization of paraffin hydrocarbons under certain conditions, and indeed processes for the isomerization of paraffin hydrocarbons using these materials as catalysts have been suggested and patented. However, none of the suggested processes can compete with the existing processes using aluminum chloride catalysts and none of them appears to have been developed beyond an elementary stage. The use of sulfide catalysts for isomerization of paraffin hydrocarbons has certain inherent limitations. Thus, it is necessary to operate at temperatures in the order of 400° C. to 600° C., and at such temperatures the equilibrium between the possible isomers is much less favorable than at the lower temperatures used in the processes employing aluminum chloride as the catalyst. The processes hitherto suggested, using sulfide catalysts have, furthermore, certain other shortcomings which have precluded their use. Most of them require the use of high pressures and/or allow only a short period of conversion before the catalyst must be regenerated or remade, and/or afford only very limited production capacity per volume of catalyst and reactor space. Thus, British Patent No. 527,767 describes a process for the isomerization of paraffin hydrocarbons with metal sulfide catalysts in which the pressure is at least 100 atmospheres and preferably at least 200 atmospheres, which pressure is at least 95% due to the hydrocarbon feed and less than 5% due to added hydrogen. The throughput capacity is satisfactory and initial conversion is excellent, but the conversion drops rapidly and the catalyst must be frequently regenerated. The regeneration of these sulfide catalysts cannot be effected by simple burning as with various known oxide catalysts, but requires a plurality of separate treating steps and cannot be economically resorted to at frequent intervals. British Patent No. 550,480 describes a process for the isomerization of paraffin hydrocarbons in the presence of small amounts of hydrogen using metal sulfide catalysts in which the pressure is within the range of 1 to 50 atmospheres. This process does not require inordinately high pressures, but only very poor conversions are obtained and, furthermore, the catalyst loses activity very rapidly.

It has now been found that the beneficial effect of hydrogen in the isomerization of paraffin hydrocarbons with metal sulfide catalysts is not a function of the partial pressure of hydrogen present, as has been hitherto believed, but is a function of the ratio of partial pressures of the hydrogen to hydrocarbon. It has been found that in order to obtain sustained catalytic activity for practical process periods the ratio of the partial pressures of hydrogen to hydrocarbon must be at least 1.5:1. However, as this ratio is increased, the production capacity per unit volume of catalyst or unit of volume of reactor space rapidly decreases. This ratio should not exceed about 8.6:1. This upper limit of the ratio of partial pressure of hydrogen to hydrocarbon corresponds to a liquid hourly space velocity of about 0.50 when operating at a pressure of about 50 atmospheres and an apparent contact time of about 1 minute. Liquid hourly space velocity is defined as the volume of hydrocarbon measured as a liquid contacted with a unit volume of catalyst bed per hour.

It has also been found, contrary to the teachings of the prior art, that the total pressure has no effect other than the known calculatable effect upon the residence time in the reaction zone which effect can generally be realized much more economically by control of the feed rate.

Thus, it has been found that the more or less selective isomerization of paraffin hydrocarbons can be effected with excellent conversions, with excellent throughput capacities, and with sustained catalytic activity under moderate working pressures, provided that the ratio of partial pressure of hydrogen to the partial pressure of hydrocarbon in the reaction zone is maintained at all times above about 1.5:1 but below about 8.6:1. The process period depends upon the particular feed and reaction conditions, and upon economic factors. It is generally quite long but in extreme cases may be as short as 24 hours.

The process of the present invention is generally applicable to the isomerization of isomerizable lower boiling paraffin hydrocarbons, such in particular as the butanes, the pentanes, the hexanes, and mixtures thereof, and mixtures consisting essentially thereof, such as lower boiling fractions of straight run gasoline, natural gasoline fractions, etc. While various mixtures of these hydrocarbons may be treated, somewhat better results are usually obtained when the material treated is a fraction of relatively small boiling range or is essentially a single hydrocarbon. The process is particularly effective for the isomerization of butane. Butane is ordinarily much more difficult to isomerize than the higher paraffin hydrocarbons. Also, the butanes are more stable under the relatively drastic reaction conditions, and therefore are, in general, less prone to undergo undesirable side reactions. Furthermore, isobutane may be readily separated from normal butane in the product by fractional distillation.

These various materials to be treated may, in general, be treated in the form in which they are produced or recovered in various refinery operations and do not, in general, require any refining or other pretreatment. The small amounts of various impurities normally present in the normal refinery products do not appear to be harmful. In fact, a small amount of sulfur compounds in the hydrocarbon feed is sometimes quite beneficial.

The process according to the present invention may be carried out with any of the known heavy metal sulfide isomerization catalysts, such in particular as the sulfides of the metals of the left hand side of group VI of the periodic system. Molybdenum sulfide and/or tungsten sulfide are particularly suitable catalysts. The catalyst may furthermore be advantageously promoted with a minor amount of a metal of the iron group. Cobalt and nickel are particularly effective promoters. Suitable amounts of nickel and/or cobalt computed as metal are, for example, in the order of 1% to 20% of the total metal sulfides present in the catalyst. Under the reaction conditions the promoter probably exists in the sulfided state.

The catalyst preferably consists predominantly of the described active components. If desired, however, the catalyst may be combined with a minor or major amount of a relatively inactive material serving as a diluent and/or binder, and/or carrier or support. The catalyst may be in any suitable form, such as pills, spheres, saddles, extrudates, powders, or irregular fragments of shape and size adapted for the particular reactor to be used.

The isomerization may be carried out with conventional apparatus and in the conventional manner. One suitable method, for example, is to vaporize and preheat the hydrocarbon feed and to pass the hydrocarbon vapors in admixture with the specified ratio of the hydrogen through a bed of the catalyst maintained at the specified conditions of temperature and pressure. After cooling to liquefy the hydrocarbon products, the gas rich in hydrogen is preferably recycled. The hydrocarbon product may be worked up in conventional manner and, if desired, unconverted material may be recycled. The hydrogen-rich gas recycled may tend to become diluted in time with gases such as methane. In this case, the rate of recycle of the hydrogen-rich gas is controlled to afford the specified ratio of hydrogen to hydrocarbon in the feed to the reaction zone. In some cases where the hydrocarbon feed is exceptionally free of sulfur compounds, the activity may be maintained somewhat better by the addition of a small amount of a sulfur compound such as hydrogen sulfide, a mercaptan, a disulfide, or the like. In other cases where the feed may contain an appreciable concentration of sulfur compounds, it may be desirable to treat a portion of the recycled hydrogen-rich gas to remove hydrogen sulfide. The control of the activity of metal sulfide catalysts by controlling the concentration of sulfur compounds in the feed to the reaction zone is well known and forms no part of the present invention.

The isomerization may be carried out at temperatures ranging from about 400° C. up to about 540° C. The process may be carried out at high pressure. However, an important advantage of the process is that high pressures are not necessary and that excellent conversions may be obtained at excellent throughput rates and with excellent sustained catalyst activity using very moderate pressures. Very suitable pressures are, for example, from about 10 atmospheres to about 120 atmospheres.

Certain of the points discussed in the above are illustrated in the following examples:

Example I

A normal butane fraction containing about 1.6% isobutane was isomerized with a molybdenum sulfide catalyst under the following conditions:

| | |
|---|---|
| Temperature _____°C__ | 450 |
| Total pressure _____atmospheres__ | 50 |
| Partial pressure of hydrogen_____do____ | 33.3 |
| Partial pressure of hydrocarbon_____do____ | 16.7 |
| Ratio of hydrogen to hydrocarbon_____ | 2:1 |
| Liquid hourly space velocity_____ | 0.96 |

The isobutane in the product was initially about 35% and after 28 hours of continuous operation was about 29%. This example illustrates operation with high conversion and a high throughput rate near the minimum allowable ratio of hydrogen to hydrocarbon.

Example II

When the same butane fraction was isomerized with the same catalyst as in Example I under the following conditions:

| | |
|---|---|
| Temperature °C | 450 |
| Total pressure atmospheres | 20 |
| Partial pressure of hydrogen do | 16.7 |
| Partial pressure of hydrocarbon do | 3.3 |
| Ratio of hydrogen to hydrocarbon | 5:1 |
| Liquid hourly space velocity | 0.35 | a sustained conversion of about 30% (i. e. about 31% isobutane in the product) was obtained. This example illustrates operation with excellent conversion at a low total pressure by using a lower throughput rate than in Example I.

Example III

The same butane fraction was isomerized with the same catalyst as in Example I under the following conditions:

| | |
|---|---|
| Temperature °C | 450 |
| Total pressure atmospheres | 50 |
| Partial pressure of hydrogen do | 41.7 |
| Partial pressure of hydrocarbon do | 8.3 |
| Ratio of hydrogen to hydrocarbon | 5:1 |
| Liquid hourly space velocity | 0.8 |

The product initially contained about 24.5% of isobutane and after 108 hours of continuous operation the product contained about 18.5% isobutane. This relatively small drop in conversion in 108 hours of continuous operation was not primarily due to the deposition of coke on the catalyst, but was primarily due to a deficiency of sulfur in the feed, since the catalyst after the 108 hours of use could be restored to substantially its initial activity by simply treating it for a short time with hydrogen sulfide.

Example IV

When the same butane fraction was isomerized with the same catalyst as described in Example I under the following conditions:

| | |
|---|---|
| Temperature °C | 450 |
| Total pressure atmospheres | 50 |
| Partial pressure of hydrogen | 0 |
| Partial pressure of hydrocarbon atmospheres | 50 |
| Liquid hourly space velocity | 1.80 | the concentration of isobutane in the product was about 24% but dropped rapidly, being about 3.5% at the end of only 6 hours of operation. This example illustrates the rapid decline in conversion obtained when operating without hydrogen as recommended, for example, in British Patent No. 548,901.

Example V

The same butane fraction was isomerized with the same catalyst as in Example I under the following conditions:

| | |
|---|---|
| Temperature °C | 450 |
| Total pressure atmospheres | 10 |
| Partial pressure of hydrogen do | 5 |
| Partial pressure of hydrocarbon do | 5 |
| Ratio of hydrogen to hydrocarbon | 1:1 |
| Liquid hourly space velocity | 0.5 |

The hydrocarbon product contained initially about 35% isobutane, but the concentration declined to about 24% in 9 hours. This example illustrates the relatively poor results obtained when the ratio of hydrogen to hydrocarbon is just slightly below the lower limit of 1.5:1. By comparison of Examples I, IV and V, it is evident that lower ratios of hydrogen to hydrocarbon, such as specified in British Patents Nos. 527,767 and 550,480, do not afford any sustained conversion.

Example VI

A normal pentane fraction containing about 7% isopentane was isomerized with a molybdenum sulfide catalyst under the following conditions:

| | |
|---|---|
| Temperature °C | 400 |
| Total pressure atmospheres | 50 |
| Partial pressure of hydrogen do | 41.7 |
| Partial pressure of hydrocarbon do | 8.3 |
| Ratio of hydrogen to hydrocarbon | 5:1 |
| Liquid hourly space velocity | 0.6 |

The product contained about 68% isopentane.

I claim as my invention:

1. Process for the catalytic isomerization of lower boiling isomerizable paraffin hydrocarbons which comprises passing a feed consisting of vapors of a lower boiling isomerizable paraffin hydrocarbon having from 4 to 6 carbon atoms and hydrogen in proportions giving a ratio of partial pressure of hydrogen to hydrocarbon between 1.5:1 and 8.6:1 in contact with a heavy metal sulfide isomerization catalyst at a temperature within the range of from about 400° C. to about 540° C. at a pressure between about 10 and about 100 atmospheres and at a liquid hourly space velocity between about 0.35 and 1.80, thereby to obtain isomerization of said paraffin hydrocarbon as the predominant reaction.

2. Process for the catalytic isomerization of lower boiling isomerizable paraffin hydrocarbons which comprises passing a feed consisting of vapors of a lower boiling isomerizable paraffin hydrocarbon having from 4 to 6 carbon atoms and hydrogen in proportions giving a ratio of partial pressure of hydrogen to hydrocarbon between 1.5:1 and 8.6:1 in contact with a heavy metal sulfide isomerization catalyst containing a minor amount of a metal of the iron group at a temperature within the range from about 400° C. to about 540° C. at a pressure between about 10 and about 100 atmospheres and at a liquid hourly space velocity between about 0.35 and 1.80, thereby to obtain isomerization of said paraffin hydrocarbon as the predominant reaction.

3. Process for the catalytic isomerization of lower boiling isomerizable paraffin hydrocarbons which comprises passing a feed consisting of vapors of a lower boiling isomerizable paraffin hydrocarbon having from 4 to 6 carbon atoms and hydrogen in proportions giving a ratio of partial pressure of hydrogen to hydrocarbon between 1.5:1 and 8.6:1 in contact with a heavy metal sulfide isomerization catalyst containing a minor amount of nickel at a temperature within the range of from about 400° C. to about 540° C. at a pressure between about 10 and about 100 atmospheres and at a liquid hourly space velocity between about 0.35 and 1.80, thereby to obtain isomerization of said paraffin hydrocarbon as the predominant reaction.

4. Process for the catalytic isomerization of butane which comprises passing vapors of butane to be isomerized in admixture with hydrogen under a superatmospheric pressure between about 10 and 100 atmospheres and at a temperature in the range of from about 400° C. to about 450° C. and at a liquid hourly space velocity between about 0.35 and about 1.80 in contact with a molybdenum sulfide catalyst, the ratio of partial pressure of hydrogen to butane being between 1.5:1 and 8.6:1.

5. Process for the catalytic isomerization of butane which comprises passing vapors of butane to be isomerized in admixture with hydrogen under superatmospheric pressure and at a temperature in the range of from about 400° C. to about 540° C. at a liquid hourly space velocity between about 0.35 and about 1.80 in contact with a heavy metal sulfide isomerization catalyst, the ratio of partial pressure of hydrogen to butane being between 1.5:1 and 8.6:1.

6. Process for the catalytic isomerization of pentane which comprises passing vapors of pentane in admixture with hydrogen under superatmospheric pressure and at a temperature in the range of from about 400° C. to about 500° C. at a liquid hourly space velocity between about 0.35 and about 1.80 in contact with a heavy metal sulfide isomerization catalyst, the ratio of partial pressure of hydrogen to pentane being between 1.5:1 and 8.6:1.

7. Process according to claim 1 in which the major active constituent of the heavy metal sulfide catalyst is a sulfide of molybdenum.

8. Process according to claim 1 in which the major active constituent of the heavy metal sulfide catalyst is a sulfide of tungsten.

BERNARD S. GREENSFELDER.